Patented July 7, 1931

1,813,618

UNITED STATES PATENT OFFICE

EUGEN GLIETENBERG, OF LEVERKUSEN-ON-THE-RHINE, JOSEF HALLER, OF WIESDORF-ON-THE-RHINE, AND MAX BALTES, OF LEVERKUSEN-ON-THE-RHINE, GERMANY, ASSIGNORS TO GENERAL ANILINE WORKS, INC., OF NEW YORK, N. Y., A CORPORATION OF DELAWARE

AZODYES DERIVED FROM 2.3-HYDROXY-NAPHTHOIC ACID ARYLAMIDES

No Drawing. Application filed July 7, 1928, Serial No. 291,134, and in Germany August 11, 1927.

The present invention relates to the new azodyestuffs of the general formula

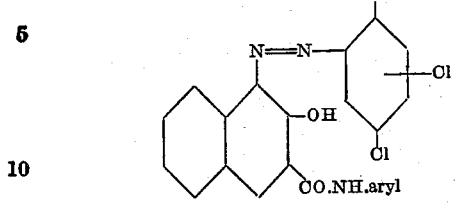

The said dyestuffs are obtainable by coupling a diazo compound of the general formula

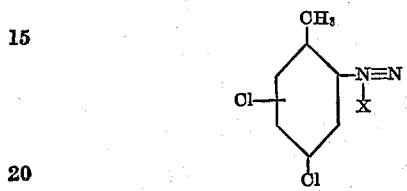

wherein X represents an acid radical with a 2.3-hydroxy-naphthoic acid arylamide.

The new dyestuffs possess remarkable fastness properties especially to light and dye cotton clear shades which are similar to those obtainable with alizarine red.

The following examples illustrate the invention, without limiting it thereto:

*Example 1.*—Cotton impregnated with a solution containing 6 parts by weight per litre of 2.3-hydroxynaphthoic acid aminohydroquinone dimethylether is developed in a solution, containing per litre 1.8 grams of diazotized 4.5-dichloro-2-toluidine and soaped at the boiling point. A clear bluish red is obtained of excellent fastness to light. The dyestuff has probably the following formula:

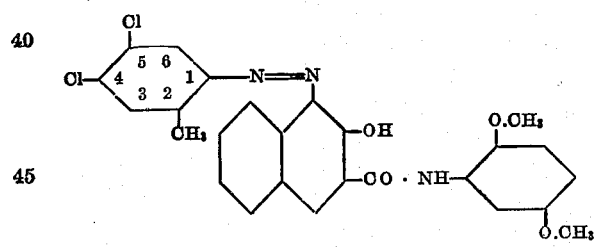

and yields upon reduction with hydrochloric acid and zinc 4.5-dichloro-2-toluidine and 1-amino-2.3-hydroxynaphthoic acid-amino-hydroquinone-dimethylether.

*Example 2.*—If instead of the 2.3-hydroxynaphthoic acid aminohydroquinone dimethylether mentioned in Example 1 the equimolecular quantity of 2.3-hydroxynaphthoic acid ortho anisidide is used, a bluish red is obtained of similar fastness properties. The dyestuff has probably the following formula:

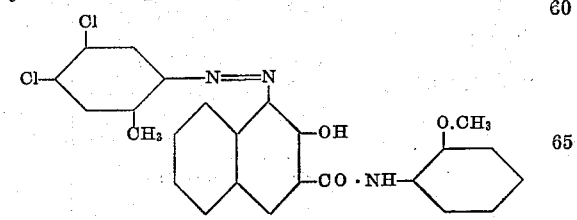

and yields upon reduction with hydrochloric acid and zinc 4.5-dichloro-2-toluidine and 1-amino-2.3-hydroxy-naphthoic acid-ortho-anisidide.

*Example 3.*—Cotton, previously impregnated with a solution containing 5 parts by weight of 2.3-hydroxynaphthoic acid α-naphthalide in 1000 parts of water is developed in a diazo solution, obtained by treating 1.8 parts by weight of 4.6-dichloro-2-toluidine with hydrochloric acid and nitrite. An extraordinarily clear bluish red is obtained of excellent fastness properties. The dyestuff has probably the following formula:

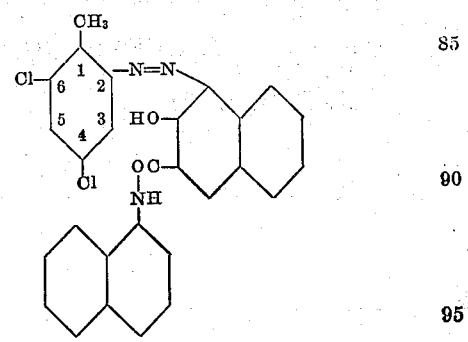

and yields upon reduction with hydrochloric acid and zinc 4.6-dichloro-2-toluidine and 1-amino-2.3-hydroxynaphthoic acid-α-naphthylamide.

Similar shades are obtained by using ether arylamides of 2.3-hydroxynaphthoic acid as coupling components.

We claim:

1. As new products, the water insoluble azodyestuffs of the probable formula:

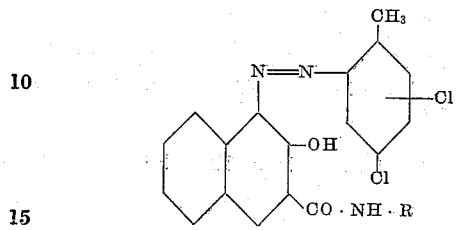

wherein R stands for a residue of the benzene or naphthalene series, giving when produced on the fibre very clear shades similar to alizarin red with remarkable fastness properties in particular to light and being when produced in substance clear red powders, dissolving in concentrated sulfuric acid with a fuchsin red coloration and which upon reduction with hydrochloric acid and zinc yield a dichloro-2-toluidine and an arylamide of 1-amino-2-hydroxy-3-naphthoic acid.

2. As a new product, the water insoluble azodyestuff of the probable formula:

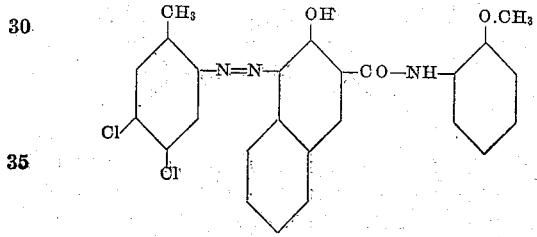

giving when produced on the fibre very clear shades similar to alizarine red with remarkable fastness properties in particular to light and being when produced in substance a clear red powder, dissolving in concentrated sulfuric acid with a fuchsin red coloration and which upon reduction with hydrochloric acid and zinc yield 4.5-dichloro-2-toluidine, and 1-amino-2-hydroxy-3-naphthoic acid ortho-anisidide.

In testimony whereof we have hereunto set our hands

EUGEN GLIETENBERG. [L. S.]
JOSEF HALLER. [L. S.]
MAX BALTES. [L. S.]